(12) United States Patent
Perez-Pena

(10) Patent No.: US 8,519,016 B2
(45) Date of Patent: Aug. 27, 2013

(54) LIGHTWEIGHT FOAMED FLY ASH BASED BINDERS AND METHOD

(75) Inventor: Marianela Perez-Pena, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 13/312,814

(22) Filed: Dec. 6, 2011

(65) Prior Publication Data

US 2012/0172469 A1    Jul. 5, 2012

Related U.S. Application Data

(60) Provisional application No. 61/428,839, filed on Dec. 30, 2010.

(51) Int. Cl.
*C04B 12/04* (2006.01)
*C08J 9/00* (2006.01)

(52) U.S. Cl.
USPC ............ 521/83; 507/269; 166/192; 166/292; 106/611; 106/612; 106/624; 106/705; 106/724

(58) Field of Classification Search
USPC ................. 521/83; 106/705, 724, 728, 737; 166/192, 292
See application file for complete search history.

(56) References Cited

U.S. PATENT DOCUMENTS

| | | |
|---|---|---|
| 3,782,984 A | 1/1974 | Allemand et al. |
| 4,430,108 A * | 2/1984 | Hojaji et al. ............ 65/22 |
| 4,488,909 A | 12/1984 | Galer et al. |
| 4,494,990 A | 1/1985 | Harris |
| 4,659,385 A * | 4/1987 | Costopoulos et al. ....... 588/257 |
| 5,109,030 A * | 4/1992 | Chao et al. ................. 521/83 |
| 5,439,518 A * | 8/1995 | Francis et al. ............. 106/705 |
| 5,490,889 A | 2/1996 | Kirkpatrick et al. |
| 5,536,310 A | 7/1996 | Brook et al. |
| 5,536,458 A | 7/1996 | Kawakita et al. |

(Continued)

FOREIGN PATENT DOCUMENTS

| | | |
|---|---|---|
| AT | 009 511 U1 | 11/2007 |
| EP | 1 801 084 A1 | 6/2007 |

OTHER PUBLICATIONS

Collepardi, M.M. "Water Reducers/Retarders" in "The Concrete Admixtures Handbook" edited by V.S. Ramachandran. Noyes Publications, New Jersey, 1995. pp. 286-297.*

(Continued)

*Primary Examiner* — Randy Gulakowski
*Assistant Examiner* — Christina Wales
(74) *Attorney, Agent, or Firm* — Novak Druce Connolly Bove + Quigg LLP; Pradip Sahu; Philip T. Petti

(57) ABSTRACT

A method of making a lightweight cementitious binder composition with improved compressive strength for products such as cementitious panels is disclosed. The method mixes fly ash, alkali metal salt of citric acid, alkali metal silicate, foaming agent for entraining air, water and in the preferred embodiment a foam stabilizing agent. Compositions which include fly ash selected from the group consisting of class C fly ash, class F fly ash and mixtures thereof, alkali metal salts of citric acid, alkali metal silicates, foaming agents, and preferably a foam stabilizer, such as polyvinyl alcohol, and do not require use of set retarders. Compositions containing class F fly ash can optionally contain Type III Portland cement.

18 Claims, 2 Drawing Sheets

(56) References Cited

U.S. PATENT DOCUMENTS

| | | |
|---|---|---|
| 5,556,458 A | 9/1996 | Brook et al. |
| 5,714,002 A | 2/1998 | Styron |
| 5,997,632 A | 12/1999 | Styron |
| 6,827,775 B2 | 12/2004 | Bugnon |
| 6,827,776 B1 | 12/2004 | Boggs et al. |
| 6,869,474 B2 | 3/2005 | Perez-Pena et al. |
| 7,670,427 B2 | 3/2010 | Perez-Pena et al. |
| 2004/0040474 A1* | 3/2004 | Perez-Pena et al. .......... 106/808 |
| 2006/0025312 A1* | 2/2006 | Santra et al. .................. 507/269 |
| 2010/0071597 A1 | 3/2010 | Perez-Pena |
| 2010/0310846 A1* | 12/2010 | Berke et al. ................... 428/219 |
| 2012/0024196 A1* | 2/2012 | Gong et al. .................... 106/694 |

OTHER PUBLICATIONS

Kearsley, E.P.; Wainwright, P.J. The effect of high fly ash content on the compressive strength of foamed concrete. Cement and Concrete Research 31 (2001) pp. 105-112.*

Kearsley, E.P.; Wainwright, P.J. "The effect of high ash content on the compressive strength of foamed concrete" Cement and Concrete Research 31 pp. 105-112.*

International Search Report dated Apr. 5, 2012 for corresponding PCT application No. PCT/US2011/066347 to Perez-Pena filed Dec. 21, 2011.

International Preliminary Report on Patentability of Jul. 2, 2013 for PCT International Application No. PCT/US2011/066347 to United States Gypsum Company, International Filing Date Dec. 21, 2011.

* cited by examiner

LIGHTWEIGHT FOAMED FLY ASH BASED BINDERS AND METHOD

CROSS-REFERENCE TO RELATED APPLICATIONS

This application claims the benefit of U.S. Provisional Application No. 61/428,839, filed Dec. 30, 2010 incorporated herein by reference in its entirety and is related to:

U.S. Provisional Application No. 61/428,819 entitled METHOD FOR IN-SITU MANUFACTURE OF A LIGHTWEIGHT FLY ASH BASED AGGREGATE, filed Dec. 30, 2010 and U.S. patent application Ser. No. 13/232,128 entitled METHOD FOR IN-SITU MANUFACTURE OF A LIGHTWEIGHT FLY ASH BASED AGGREGATE, filed Sep. 14, 2011 each of which is incorporated herein by reference in its entirety.

FIELD OF THE INVENTION

This invention relates generally to fast setting cementitious compositions that can be used for a variety of applications in which rapid hardening and attainment of early strength is desirable. In particular, the invention relates to cementitious foamed fly ash based binder compositions that can be used to make cementitious boards with excellent moisture durability for use in wet and dry locations in buildings. Precast concrete products such as cement boards are made under conditions which provide a rapid setting of the cementitious mixture so that the boards can be handled soon after the cementitious mixture is poured into a stationary or moving form or over a continuously moving belt. Ideally, this setting of the cement mixture may be achieved as soon as about 20 minutes, preferably as soon as 10 to 13 minutes, more preferably as soon as 4 to 6 minutes, after mixing the cement mixture with a suitable amount of water.

U.S. Pat. No. 6,869,474 to Perez-Pena et al, incorporated herein by reference, discusses extremely fast setting of cementitious compositions for producing cement-based products such as cement boards achieved by adding an alkanolamine to hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. The extremely rapid set permits rapid production of cementitious products. Triethanolamine additions have been found to be a very powerful accelerator capable of producing formulations with relatively short final setting times with increased levels of fly ash and gypsum and without the need of calcium aluminate cements. However, formulations with triethanolamine contain mainly hydraulic cements such as portland cement and gypsum as the reactive powder which limits the availability of aluminate phases compared to the aluminosilicate phases which result from the activation of the fly ash materials as described in the present invention.

U.S. Pat. No. 7,670,427 of Perez-Pena et al, incorporated herein by reference, discusses extremely fast setting of cementitious compositions with early-age compressive strength for producing cement-based products such as cement boards achieved by adding an alkanolamine and a phosphate to a hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. Again, all of the compositions contained a significant amount of hydraulic cement and gypsum.

Published US Patent Application No. US 2010-0071597 A1 (U.S. patent application Ser. No. 12/237,634 filed Sep. 25, 2008) of Perez-Pena discloses formulations using fly ash and alkali metal salts of citric acid such as sodium citrate to form concrete mixes with fast setting time and relatively high early age compressive strength. One of the challenges encountered with the activated fly ash binders described in this application, is an apparent pessimum interaction between these binders and the traditional foaming systems used to entrain air and thereby make lightweight boards. The fly ash based binders which have been made with traditional foams in accordance with this disclosed method have suffered foam collapsing and/or drastic strength reduction.

U.S. Pat. No. 4,488,909 to Galer et al, incorporated herein by reference, discusses cementitious compositions capable of rapid setting. The compositions permit high speed production of carbon dioxide resistant products by forming essentially all of the potential ettringite within about 20 minutes after the composition is mixed with water. The essential components of the cementitious composition are portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement, which in combination with the other components makes possible the early formation of ettringite and other calcium aluminate hydrates responsible for early setting of the cementitious mixture. In their invention, Galer et al provided aluminates using high alumina cement (HAC) and sulfate ions using gypsum to form ettringite and achieve rapid setting of their cementitious mixture.

Ettringite is a calcium aluminum sulfate compound having the formula $Ca_6Al_2(SO_4)_3 \cdot 32H_2O$ or alternatively $3CaO \cdot Al_2O_3 \cdot 3CaSO_4 \cdot 32H_2O$. Ettringite forms as long needle-like crystals and provides rapid early strength to cement boards, so that they can be handled soon after being poured into a mold or over a continuous casting and forming belt.

In general, Galer et al's rapid setting formulation suffers from several limitations.

U.S. Pat. No. 5,536,310 to Brook et al disclose a cementitious composition containing 10-30 parts by weight (pbw) of a hydraulic cement such as portland cement, 50-80 pbw fly ash, and 0.5-8.0 pbw expressed as a free acid of a carboxylic acid such as citric acid or alkali metal salts thereof, e.g., tripotassium citrate or trisodium citrate, with other conventional additives, including retarder additives such as boric acid or borax, which are used to accelerate the reaction and setting time of the composition to overcome the disclosed disadvantageous of using a high fly ash content in cement compositions.

U.S. Pat. No. 5,536,458 to Brook et al disclose a cementitious composition containing a hydraulic cement such as portland cement, 70-80 parts by weight fly ash, and 0.5-8.0 pbw of a free carboxylic acid such as citric acid or an alkali metal salts thereof e.g. potassium citrate or sodium citrate, additives like potassium hydroxide with other conventional additives including retarder additives such as boric acid or borax, which are used to accelerate the reaction and setting time of the composition to overcome the known disadvantageous of using a high fly ash content in cement compositions.

U.S. Pat. No. 4,494,990 to Harris discloses a cementitious mixture of portland cement e.g. 25-60 pbw, fly ash e.g. 3-50 pbw and less than 1 pbw of sodium citrate.

U.S. Pat. No. 6,827,776 to Boggs et al disclose a hydraulic cement composition comprising portland cement, fly ash, which has a setting time controlled by pH of an activator slurry of an acid, preferably citric acid, and a base which can be an alkali or alkaline earth metal hydroxide or salt of the acid component.

U.S. Pat. No. 5,490,889 to Kirkpatrick et al disclose a blended hydraulic cement consisting of water, fly ash (50.33-83.63 pbw), portland cement, ground silica, boric acid, borax, citric acid (0.04-2.85 pbw) and an alkali metal activator, e.g. lithium hydroxide (LiOH) or potassium hydroxide.

U.S. Pat. No. 5,997,632 to Styron discloses a hydraulic cement composition containing 88-98 wt. % fly ash, 1-10 wt. % portland cement and from about 0.1-4.0 wt. % citric acid. Lime to achieve a desirable minimum lime content of 21% is provided by the subbituminous fly ash or the sub-bituminous fly ash in combination with a beneficiating agent. In addition to citric acid, Styron uses an alkali source such as potassium or sodium hydroxide.

The final setting times of the cementitious mixtures of prior art products are typically greater than 9 minutes and can extend to 2-3 hours for standard concrete products. The final setting time is normally defined as the time in which the cementitious mixtures set to the extent that the concrete products made thereof can be handled and stacked, although chemical reactions may continue for extended periods.

The amounts of type I portland cement (also known as OPC) and/or type III portland cement, as well as the use of high alumina cement (also known as calcium aluminate cement) in the reactive powder blend in prior art concrete products are also very high. Typically, the high portland cements are greater than 60% and alumina cement is greater than 14 wt % of the reactive powder blend.

There is a need to find a method to reduce the weight of portland cements, aluminous cements and fly ash based binder mixes so these formulations can be used to manufacture lightweight cementitious concrete products for applications such as backer board and other wall or ceiling applications with improved strength. The present method has developed formulations with enhanced compressive strength at reduced weight and with reduced cost.

SUMMARY OF THE INVENTION

The present invention provides a method of making a fast setting foamed fly ash based cementitious binder composition.

The invention also provides a lightweight cementitious compositions with reduced weight and enhanced early and final compressive strength. The cementitious compositions is formed from a foamed binder solution containing sodium citrates, sodium silicates, foaming agents, foam stabilizer and a reactive powder comprising fly ash preferably in the form of Class C fly ash or blends of class C and class F fly ash.

The present invention includes a method of providing a lightweight cementitious mixture having rapid set, improved compressive strength and water durability comprising: mixing at ambient or above ambient temperatures, water, reactive powder, a set accelerating amount of alkali metal salt of citric acid, and a reactive powder lightweight aggregate wherein the ratio of water to reactive powder solids is about 0.17 to 0.27:1.0 and more preferably about 0.20 to 0.25:1.0, the reactive powder comprising essentially 100 wt. % fly ash, and no hydraulic cement and no gypsum (hydrated calcium sulfate).

This cementitious reactive powder includes at least fly ash and may also include portland cement type I (OPC) and/or type III portland cement, calcium aluminate cement (CAC) (also commonly referred to as aluminous cement or high alumina cement), and a non-fly ash mineral additive.

Up to 40 wt % of the cementitious reactive powder blend of the cementitious composition may be non-fly ash mineral additives possessing substantial, little, or no cementing properties.

Type C fly ash generally contains lime. Thus, the reactive powder blend of the cementitious composition is typically free of externally added lime.

Typically the slurry has an initial temperature of from room temperature (about 75° F.) to about 100°-115° F. (24° C. to about 38°-46° C.).

The final setting time (i.e., the time after which cementitious boards can be handled) of the cementitious composition as measured according to the Gilmore needle should be at most 20 minutes, preferably 10 to 13 minutes or less, more preferably about 4 to 6 minutes after being mixed with a suitable amount of water. A shorter setting time and higher early age compressive strength helps to increase the production output and lower the product manufacturing cost.

The very fast setting cementitious compositions of this invention can be used for a variety of applications in which rapid hardening and attainment of early strength is desirable. Using the alkali metal salt of citric acid, such as potassium citrate and/or sodium citrate, to accelerate setting of the cementitious composition, when the slurry is formed at elevated temperatures, makes possible increased rate of production of cementitious products such as cement boards.

The dosage of alkali metal citrate in the slurry is in the range of about 1.5 to 6 wt. %, preferably about 1.5 to 4.0 wt. %, more preferably about 2 to 3.5 wt. %, and most preferably about 3.5 wt. % based on the cementitious reactive components of the invention. Sodium citrates are preferred, although potassium citrate or a blend of sodium and potassium citrate can be used. As mentioned above, these weight percents are based on 100 parts by weight of the reactive components (cementitious reactive powder). Thus for example, for 100 pounds of cementitious reactive powder, there may be about 1.5 to 4.0 total pounds of sodium citrates.

A typical cementitious reactive powder of this invention comprises 75 to 100 wt % fly ash and 0 wt. % hydraulic cement or gypsum. Typically at least half of the fly ash is Type C fly ash.

Another typical cementitious reactive powder includes 75 to 100 wt % fly ash, zero to 25 wt % type III portland cement, based on the weight of the reactive powder, wherein the fly ash comprises class F fly ash.

There is a synergistic interaction between the alkali metal citrate, alkali metal silicate and the fly ash. Adding alkali metal silicate e.g. sodium silicate, has the benefits of achieving increasing early and long term compressive strength for compositions containing high amounts of fly ash compared with comparable compositions using accelerators like calcium aluminate cements, triethanolamine or the corrosive alkali metal hydroxides, such as potassium or sodium hydroxide.

In addition, adding the alkali metal citrates and alkali metal silicates improves mix fluidity contrary to other accelerators such as aluminum sulfate which may lead to premature stiffening of concrete mixtures.

Other additives, e.g., inert aggregate, may also be present, which are not considered cementitious reactive powder, but are part of the overall cementitious composition. Such other additives include one or more of sand, aggregate, lightweight fillers, water reducing agents such as superplasticizers, set accelerating agents, set retarding agents, air-entraining agents, foaming agents, shrinkage control agents, slurry viscosity modifying agents (thickeners), coloring agents and internal curing agents, may be included as desired depending upon the process ability and application of the cementitious composition of the invention.

The lightweight cementitious compositions of the present invention can be used to make precast concrete building products such as cementitious boards with excellent moisture durability for use in wet and dry locations in buildings. The precast concrete products such as cement boards are made under conditions which provide a rapid setting of the cementitious mixture so that the boards can be handled soon after the cementitious mixture is poured into a stationary or moving form or over a continuously moving belt.

The lightweight cementitious compositions can be used in any concrete product application including concrete panels, flooring, overlays, finishes, capping, as well as patching mixes for concrete roads. The concrete products made with the lightweight compositions of this invention have particular advantages for use which require water durability compared to compositions which contain gypsum and applications which require higher compressive strength than cement containing compositions which have a higher carbon foot print.

All percentages, ratios and proportions herein are by weight, unless otherwise specified.

DETAILED DESCRIPTION OF THE INVENTION

Figure 1:
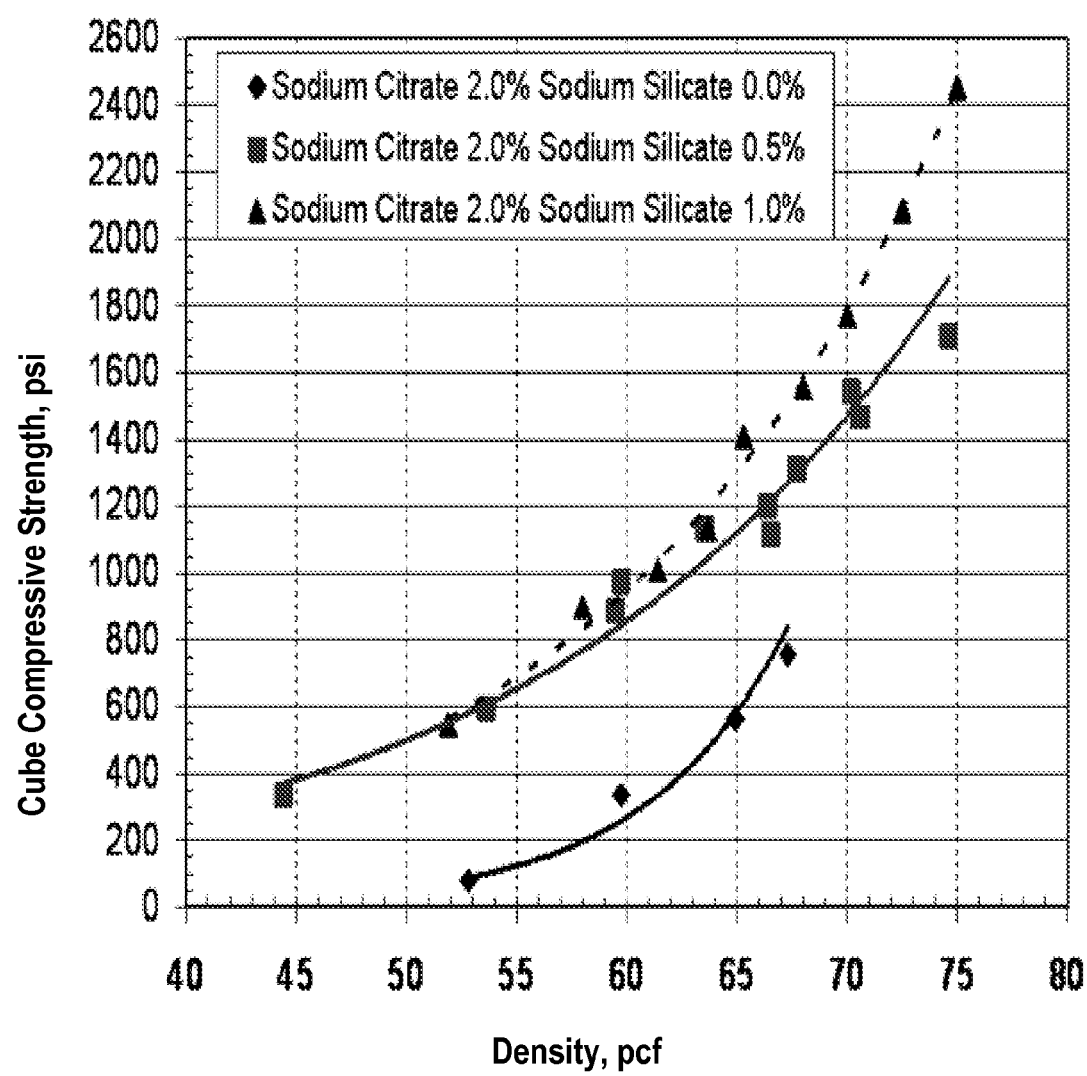
FIG. 1 is a graph of the results of Example 1 showing the effect of sodium citrate and sodium silicates compared to sodium citrates alone on cube compressive strength versus density for foamed fly ash mixes with sodium citrate, sodium silicate foamed in-situ using an alpha olefin sulfonate soap foaming agent.

The present invention includes a method of providing a lightweight cementitious mixture having improved compressive strength and water durability comprising: mixing water, reactive powder, an alkali metal salt of citric acid, and lightweight aggregate wherein the ratio of water to reactive powder solids is about 0.17 to 0.35:1.0, typically about 0.17 to 0.30:1.0, more preferably about 0.2 to 0.23:1.0. The reactive powder comprises 75 to 100 wt. % fly ash and 0 to 25 wt. % hydraulic cement and/or or gypsum. Typically the present invention mixes the cementitious reactive powder including fly ash with potassium citrates and/or sodium citrates and water at an initial slurry temperature of at least room temperature to 115° F. (24° C. to 41° C.) to yield a rapid set of preferably less than 10 to 13 minutes, more preferably about 4 to 6 minutes or less.

The present invention also provides cementitious compositions with enhanced rapid final setting performance and enhanced early compressive strength.

The typical ingredients are listed in the following TABLE A.

TABLE A

| | parts by weight, dry basis per 100 parts by weight Reactive Powder | | |
|---|---|---|---|
| Ingredient | Broad | Preferred | More preferred |
| Reactive Powder (100 parts) | | | |
| Total Fly Ash (class C or Class C and Class F blend) | 80 to 100 | 88.5 to 100 | 100 |
| Class F Fly Ash in total fly ash | about 0-46 | about 0-30 | None |
| Portland Cement | 0-25 | 0-11.5 | None |
| Calcium aluminate cement | less than 25 | 10-11.5 | None |
| Non-fly ash mineral additive | optional | optional | None |
| added lime | optional* | None | None |
| Alkali metal salt of citric acid | 1.5 to 6 | 1.5 to 4 | 2 to 3.5 |
| Lightweight aggregate | 1-200 | 2-125 | |
| Sodium silicate | 0.5 to 1.5 | 0.5 to 1.0 | 0.5 to 1.0 |
| Foam/air-entraining agent (alpha olefin sulfonate soap) | 2.0 to 6.0 | | |
| Superplasticizer | 0.1 to 1 | | |

*added lime not needed if reactive powder ingredients already contain sufficient lime.

Generally the weight ratio of water to cementitious reactive powder is about 0.15 to 0.3:1.0. Inert lightweight aggregates are not part of the cementitious reactive powder.

While not wishing to be limited to a particular theory, it is theorized increased early age compressive strengths are achieved with rapid sets by providing the cementitious reactive powder, with high fly ash mineral content of 75 to 100 wt % comprising class C fly ash alone or a blend of class C and class F fly ash; and no portland cement, calcium aluminate cement or gypsum; and mixing the cementitious reactive powder, alkali metal citrate, alkali metal silicate and water to form slurry at room temperature or elevated temperatures above 20° C. so formation of alkali alumino silicate hydrates and/or hydrates of alumino silicate and/or calcium alumino silicate compounds present in the fly ash can take place as a result of the hydration of this reactive powder blend with the alkali metal citrate.

Thus, a minimum amount of water is provided to hydrate the cementitious reactive powder and to rapidly form alkali alumino silicate hydrates and other hydrates present in the fly ash. The addition of alkali salts of citric acid greatly facilitates the workability of the cementitious slurry. Typically, in the slurry the weight ratio of the water to reactive powder blend is about 0.20 to 0.35:1, more typically about 0.20 to 0.30:1, preferably about 0.20 to 0.25:1. The amount of water depends on the needs of the individual materials present in the cementitious composition.

The alkali alumino silicate hydrates and/or other hydrates of alumino silicate and/or calcium alumino silicate compounds form very rapidly in the hydration process thus imparting rapid set and rigidity to the mixtures made with the cementitious reactive powder blend of the cementitious composition of the invention. In manufacturing of cement-based products such as cement boards, it is primarily the formation of alkali alumino silicate hydrates and/or other hydrates of alumino silicate and/or calcium alumino silicate compounds that makes possible handling of cement boards within a few minutes after the cementitious composition of the invention is mixed with a suitable amount of water.

Setting of the composition is characterized by initial and final set times, as measured using Gilmore needles specified in the ASTM C266 test procedure. The final set time also corresponds to the time when a concrete product, e.g., a concrete panel, has sufficiently hardened so that it can be handled or trafficked, in the case of a concrete floor or road. Relatively higher early age (3 to 5 hours) compressive strength can be an advantage for concrete material because it can withstand higher stresses without deformation. It will be understood by those skilled in the art that curing reactions continue for extended periods after the final setting time has been reached.

Early age strength of the composition is characterized by measuring the compressive strength after 24 hours or after 14 days of curing as specified in the ASTM C109. Achieving high early strength allows for ease of handling the stacked panels.

In the preferred compositions of the present invention, final set times of about 5 minutes are achieved with mortar densities in the range of 60 to 65 pounds per cubic foot (pcf) and achieving cube compressive strengths in the range of about 1,000 to 1,400 psi.

Cementitious Reactive Powder

The cementitious reactive powder contains fly ash and optionally portland cement. The cementitious reactive powder typically contains 75 to 100 wt. %, more typically 80 to 100 wt. %, fly ash and 0 to 25 wt. % of portland cement. The cementitious reactive powder preferably contains 88.5-100 wt % fly ash. The cementitious reactive powder more preferably contains 100 wt % class C fly ash and no hydraulic cement.

Preferably the cementitious reactive powder contains 10 to 40 wt. % lime. However, this lime is generally not added lime. Rather it is included as a chemical component of the fly ash.

The principal ingredient of the cementitious reactive powder of the cementitious composition of the invention is a fly ash mineral additive, preferably Class C fly ash. Fly ash is described below in the section entitled Fly ash and Non-fly ash Mineral Additives.

In addition to fly ash, the cementitious reactive powder may include 0 to 25 wt. % of optional cementitious additives such as portland cement, calcium aluminate cement, calcium sulfate or gypsum (landplaster). However, the lower water content cementitious compositions of the invention, i.e. cementitious compositions with a water to reactive powder weight ratio of about 0.17 to 0.35:1.0, with these optional cementitious additives have a significantly reduced compressive strength compared to the same lower water content compositions of the invention without the additional cementitious additives.

For example, in some cementitious reactive powder blends when compressive strength is not required or when higher water to reactive powder ratios are to be used, e.g. at ratios above about 0.35:1.0, portland cement can be used at about 0 to 25 wt % and fly ash 75 to 100 wt %.

Fly Ash and Non-Fly Ash Mineral Additives

The hydraulic cement of traditional reactive powder compositions is substantially replaced by fly ash having pozzolanic properties, such as Class C fly ash, Class F fly ash or blends thereof, particularly Class C fly ash. Other optional non-fly ash mineral additives possessing substantial, little, or no cementing properties can be added. When added, non-fly ash mineral additives having pozzolanic properties are preferred in the cementitious reactive powder of the invention.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, perlite, diatomaceous earth, silica fume, tuff, trass, rice husk, metakaolin, ground granulated blast furnace slag, and fly ash.

All of these pozzolanic materials can be used either singly or in combined form as part of the cementitious reactive powder of the invention.

Fly ash is the preferred pozzolan in the cementitious reactive powder blend of the invention. Fly ashes containing high calcium oxide and calcium aluminate content (such as Class C fly ashes of ASTM C618 standard) are preferred as explained below. Other mineral additives such as calcium carbonate, vermiculite, clays, and crushed mica may also be included as optional mineral additives.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically have high calcium oxide (lime) content.

Class C fly ash usually has cementitious properties in addition to pozzolanic properties due to free lime (calcium oxide), whereas Class F is rarely cementitious when mixed with water alone. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results, particularly in the preferred formulations in which calcium aluminate cement and gypsum are not used.

Typically at least 50 wt. % of the fly ash in the cementitious reactive powder is Class C fly ash. More typically at least 75 wt. % of the cementitious reactive powder is Class C fly ash. Still more preferably at least 88.5 wt. % of the cementitious reactive powder is Class C fly ash.

Typical minerals found in fly ash are quartz ($SiO_2$), mullite ($Al_2Si_2O_{13}$), gehlenite ($Ca_2Al_2SiO_7$), haematite ($Fe_2O_3$), magnetite ($Fe_3O_4$), among others. In addition, aluminum silicate polymorphs minerals commonly found in rocks such as sillimanite, kyanite and andalusite all three represented by molecular formula of $Al_2SiO_5$ are also found in fly ash.

A typical suitable Class C fly ash made from sub-bituminous coal has the following composition listed in TABLE B.

TABLE B typical suitable Class C fly ash

| Component | Proportion (wt. %) |
|---|---|
| $SiO_2$ | 20-40 |
| $Al_2O_2$ | 10-30 |
| $Fe_2O_3$ | 3-10 |
| MgO | 0.5-8 |
| $SO_3$ | 1-8 |
| C | 0.5-2 |
| $H_2O$ | 0.33-3 |
| CaO | 25-35 |
| $K_2O$ | 0.5-4 |
| $Na_2O$ | 0.5-6 |

The fineness of the fly ash is typically such that less than about 34% is retained on a 325 mesh sieve (U.S. Series) as tested on ASTM Test Procedure C-311 ("Sampling and Testing Procedures for Fly Ash as Mineral Admixture for Portland Cement Concrete"). This fly ash is preferably recovered and used dry because of its self-setting nature.

A typical suitable Class F fly ash has the following composition listed in TABLE C.

TABLE C typical suitable Class F fly ash

| Component | Proportion (wt. %) |
|---|---|
| $SiO_2$ | 50-65 |
| $Al_2O_2$ | 10-30 |
| $Fe_2O_3$ | 3-10 |
| MgO | 0.5-3 |
| $SO_3$ | 0.3-4 |
| C | 0.25-3 |
| $H_2O$ | 0.33-3 |
| CaO | 0-10 |
| $K_2O$ | 0.5-4 |
| $Na_2O$ | 1-6 |

Fly ash makes up substantially all of the cementitious material of the reactive powder of the invention. The addition of other common cementitious additives are not needed with class C fly ash and have been found to reduce the ultimate compressive strength of the lightweight aggregate compositions of the invention.

In the case when class F fly ash, which has substantially less alumina and lime content than class C fly ash, is used in place of a substantial amount of the class C fly ash, i.e. above about 46-60 wt % of the combined fly ash, it has been found the addition of Type III Portland cement is required to increase the compressive strength of the Class F fly ash binder to the levels obtained with compositions containing 60 wt % or more of Class C fly ash, which has substantially more alumina and lime content. In particular when up to 60 wt % Class F fly ash is used in the binder system, the addition of up to 30 wt % type III Portland cement is needed to increase the compressive strength of the binder more than three and a half times more than the addition of only class C fly ash to the Class F fly ash. Thus, when class F fly ash is used in the present binder, the preferred mixture is about 46 to 60 wt % class F fly ash, 10 to 29 wt % Type III Portland Cement and 10 to 32 wt % Class C fly ash and 2 to 4 wt % sodium citrate with water. The ratio of water to fly ash and when required, any Portland cement should be maintained below about 0.37 and more preferably below about 0.33.

In the present invention, the need for the use of hydraulic cement, like Type III Portland cement, can be avoided, and relatively fast early age strength development can be obtained using substantial all Class C fly ash instead of mixtures of Class F fly ash containing Type III Portland cement as the reactive powder. Other conventional cements used in reactive powder, including Type I and Type II portland cement or other hydraulic cements including white cement, slag cements such as blast-furnace slag cement, and pozzolan blended cements, expansive cements, calcium sulfo-aluminate cements, and oil-well cements, are not required when the reactive powder is the preferred class C fly ash of this invention.

Alkali Metal Salts of Citric Acid

In the present invention, use of alkali metal salts of citric acid such as sodium or potassium citrate, makes mixes with relatively good fluidity and which do not stiffen too quickly, i.e., do not stiffen faster than 5-10 minutes after mixing at temperatures above room temperature, while achieving good early age compressive strength.

The dosage of alkali metal salt of citric acid, e.g. potassium citrate or sodium citrates, is about 1.5 to 6.0 wt. %, preferably about 1.5 to 4.0 wt. %, more preferably about 2.0 to 3.5 wt. % and most preferably about 3.5 wt % based on 100 parts of the cementitious reactive components of the invention. Thus for example, for 100 pounds of cementitious reactive powder, there may be about 1.5 to 4.0 total pounds of potassium and/or sodium citrates. The preferred alkali metal citrates are potassium citrates and sodium citrates and particularly tri-potassium citrate monohydrate and tri-sodium citrate monohydrate.

Alkali Metal Silicates

In the present invention, use of alkali metal silicates such as sodium silicate or potassium silicate, makes mixes with relatively good fluidity and which do not stiffen too quickly, i.e., do not stiffen faster than 5-10 minutes after mixing at temperatures above room temperature, while achieving good early age compressive strength.

The dosage of anhydrous sodium silicate or potassium silicate, is about 0.25 to 1.0 wt. %, preferably about 0.5 wt. to 1.0 wt. %, and more preferably about 1.0 based on 100 parts of the cementitious reactive components of the invention. Thus for example, for 100 pounds of cementitious reactive powder, there may be about 0.5 to 1.0 total pounds of potassium and/or sodium silicates. The preferred alkali metal silicates are anhydrous sodium trioxyl metasilicates, and particularly sodium silicate pentahydrate 212.74 from Fischer Scientific (technical grade).

Set Retarders

Use of set retarders as a component in the compositions of the invention is optional. The primary function of a retarder is to keep the slurry mixture from stiffening too rapidly thereby promoting synergistic physical interaction and chemical reaction between the different reactive components.

Conventional retarders like citric acid, tartaric acid, malic acid, acetic acid, boric acid, etc. can be avoided with the use of the alkali metal salts of citric acid, e.g., sodium or potassium citrate, and use of these alkali metal citrates, in the absence of these conventional set retarders, provides for good fluidity and prevents the concrete slurry from stiffening too quickly.

Secondary Inorganic Set Accelerators

As discussed above, the alkali metal citrates are primarily responsible for imparting extremely rapid setting characteristics, good fluidity, in the absence of additional retarders, as well as relatively high compressive strength to the cementitious mixtures. However, in combination with the alkali metal citrates, other inorganic set accelerators may be added as secondary inorganic set accelerators in the cementitious composition of the invention.

Addition of these secondary inorganic set accelerators is expected to impart only a small reduction in setting time in comparison to the reduction achieved due to the addition of the alkali metal citrate. Examples of such secondary inorganic set accelerators include a sodium carbonate, potassium carbonate, calcium nitrate, calcium nitrite, calcium formate, calcium acetate, calcium chloride, lithium carbonate, lithium nitrate, lithium nitrite, aluminum sulfate, alkanolamines, polyphosphates and the like. The use of potassium hydroxide, sodium hydroxide and calcium chloride should be avoided when corrosion of cement board fasteners is of concern. Secondary inorganic set accelerators are normally not needed. The use of secondary set accelerators is not required and is not a part of the preferred composition of the invention. If used, the weight ratio of the secondary inorganic set accelerator to 100 parts by weight of the cementitious reactive powder blend typically will be less than about 1.0 wt. %, preferably less than about 0.25 wt %. These secondary inorganic set accelerators can be used alone or in combination.

Superplasticizers and Air Entraining Agents

Water reducing agents (superplasticizers), can be avoided with the use of the alkali metal salts of citric acid, e.g. sodium or potassium citrate, and use of these alkali metal citrates provides for good fluidity and prevents the concrete slurry from stiffening too quickly.

Air entraining agents are added to the cementitious slurry of the invention to form air bubbles (foam) in situ. Air entraining agents are typically surfactants used to purposely trap microscopic air bubbles in the concrete. Alternatively, air entraining agents are employed to externally produce foam which is introduced into the mixtures of the compositions of the invention during the mixing operation to reduce the density of the product. Typically to externally produce foam the air entraining agent (also known as a liquid foaming agent), air and water are mixed to form foam in a suitable foam generating apparatus. A foam stabilizing agent such as polyvinyl alcohol can be added to the foam before the foam is added to the cementitious slurry.

Examples of air entraining/foaming agents include alkyl sulfonates, alkylbenzolfulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Typically the air entraining (foaming) agent is about 0.01 to 8 wt. % of the weight of the overall cementitious composition.

Other chemical admixtures such as shrinkage control agents, coloring agents, viscosity modifying agents (thickeners) and internal curing agents may also be added in the compositions of the invention if desired.

Scrims

Discrete reinforcing fibers of different types may also be included in the cementitious board compositions made with the binder of the invention. Scrims made of materials such as polymer-coated glass fibers and polymeric materials such as polypropylene, polyethylene and nylon may be used to reinforce the cement-based product depending upon its function and application. Cement boards, produced according the present invention, are typically reinforced with scrims made of polymer-coated glass fibers.

Aggregates and Fillers

While the disclosed cementitious reactive powder blend defines the rapid setting component of the cementitious composition of the invention, it will be understood by those skilled in the art that other materials may be included in the composition depending on its intended use and application.

For instance, for cement board applications, it is desirable to produce lightweight boards without unduly compromising the desired mechanical properties of the product. This objective is achieved by adding lightweight aggregates and fillers. Examples of useful lightweight aggregates and fillers include blast furnace slag, volcanic tuff, pumice, expanded forms of clay, shale, and perlite, hollow ceramic spheres, hollow plastic spheres, expanded plastic beads, and the like. For producing cement boards, expanded clay and shale aggregates are particularly useful. Expanded plastic beads and hollow plastic spheres when used in the composition are required in very small quantity on weight basis owing to their extremely low bulk density.

Depending on the choice of lightweight aggregate or filler selected, the weight ratio of the lightweight aggregate or filler to the reactive powder blend may be about 1/100 to 200/100, preferably about 2/100 to 125/100. For example, for making lightweight cement boards, the weight ratio of the lightweight aggregate or filler to the reactive powder blend preferably will be about 2/100 to 125/100. In applications where the lightweight product feature is not a critical criterion, river sand and coarse aggregate as normally used in concrete construction may be utilized as part of the composition of the invention.

Initial Slurry Temperature

In the present invention, forming the slurry under conditions which provide an initially high slurry temperature was found to be important to achieve rapid setting and hardening of cementitious formulations. The initial slurry temperature should be at least about room temperature. Slurry temperatures in the range of 38° C. to 41° C. produce short setting times, and are therefore preferred.

In general, within this range increasing the initial temperature of the slurry increases the rate of temperature rise as the reactions proceed and reduces the setting time. Thus, an initial slurry temperature of 95° F. (35° C.) is preferred over an initial slurry temperature of 90° F. (32.2° C.), a temperature of 100° F. (37.7° C.) is preferred over 95° F. (35° C.), a temperature of 115° F. (41.1° C.) is preferred over 100° F. (37.7° C.), a temperature of 110° F. (40.6° C.) is preferred over 105° F. (41.1° C.) and so on. It is believed the benefits of increasing the initial slurry temperature decrease as the upper end of the broad temperature range is approached.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive solids, the resulting slurry is at the desired temperature. Alternatively, if desired the solids could be provided at above ambient temperatures. Using steam to provide heat to the slurry is another possible method that could be adopted.

Although potentially slower, a slurry could be prepared at ambient temperatures, and promptly (e.g., within about 10, 5, 2 or 1 minutes) heated to raise the temperature to about 90° F. or higher (or any of the other above-listed ranges), and still achieve benefits of the present invention.

Manufacturing of Precast Concrete Products Such as Cement Boards

Precast concrete products such as cement boards are manufactured most efficiently in a continuous process in which the reactive powder is blended with aggregates, fillers and other necessary ingredients, followed by addition of water and other chemical additives just prior to placing the mixture in a mold or over a continuous casting and forming belt.

Due to the rapid setting characteristics of the cementitious mixture it should be appreciated that the mixing of dry components of the cementitious blend with water usually will be done just prior to the casting operation. As a consequence of the formation of the alkali alumino silicate hydrates and/or other hydrates of alumino silicates and/or calcium alumino silicate compounds, the concrete product becomes rigid, ready to be cut, handled and stacked for further curing.

Two methods have been used for entraining air in the fly ash binders.

One approach (Example 1 below) was by adding the foaming admixtures, i.e. alpha olefin sulfonate (AOS) soap to the fly ash binders and generate the bubbles or air pockets in-situ while the fly ash binders were mixed for a determined amount of time. In the second approach the foam was prepared ex-situ and blended with the fly ash binders. In this case it was found that to prevent the foam bubbles to collapse while blending into the fly ash slurries it was necessary to use a blend of the alpha olefin sulfonate (AOS) soap and polyvinyl alcohol (PVOH). The addition of the PVOH acted as a stabilizer and it appears to be crucial to the foam stability and cellular integrity of the foamed fly ash binders.

The following foamed fly ash compositions described here contain 75-80.5% fly ash, 3 to 6% sodium (or potassium) citrate, 0.5 to 1.5% sodium silicate, 14 to 20% water and 0.4 to 0.7% foaming agent as percent of the total composition. The sodium citrate can be replaced for potassium citrate or a blend of both can be used. The preferred foaming agent is stable soap made of long carbon chain ($C_{12}$-$C_{16}$) and contains no ammonia to prevent the unwanted ammonia smell as the reaction is taking place during the mixing operation.

This work will show that the successful production of foamed fly ash binders requires optimization of two parameters:

Reaction rate of the fly ash binders.

Method for introducing the foam to the fly ash/sodium citrate binder.

The water, sodium citrate, sodium silicate and foaming agent are first mixed homogeneously. These ingredients are added to the fly ash reactive powder. Foaming of this mixture starts immediately and is complete within 3 to 6 minutes. The mixture temperature rise starts soon after mixing, indicating an exothermic reaction as described in previous patent application by the author. Hardening at room temperature continues for the first 24 hr and final strength achieved within few days. The in-situ foam binders formed this presents a unique combination of low weight associated with improved compressive strengths.

The above components were combined using a weight ratio of water to reactive powder (fly ash) of 0.18/1 to 0.23. The cube compressive strength of the mixes was measured standard tests procedures. The microstructure of the mixes was analyzed using a scanning electron microscope.

EXAMPLES

The following examples illustrate the influence of alkali metal citrate and sodium citrate addition on the slurry temperature rise behavior, setting characteristics and cube compressive strength (CCS) of the cementitious compositions of the invention. The mixture of portland cement, class C fly ash, and calcium sulfate dihydrate (landplaster) as the components of the reactive powder.

Example 1

Mixing Procedure (In-Situ Foams)

Sodium silicate is added to water and dissolved. Sodium citrate is added to the solution and dissolved. Soap is added to the resulting sodium silicate/sodium citrate solution. The solution of sodium silicate, sodium citrate and soap is then added to the fly ash reactive powder and mixed in a Hobart mixer at medium speed. After about 40 seconds, the mixing speed is increased (#3) and mixing is continued for a total of up to 4-6 minutes.

A solution containing 2.5 to 8.0% sodium silicate, 15 to 35% sodium citrate is made stirring until all the sodium silicate first and then the sodium citrate has been dissolved. To this solution 3-6% foaming agent is added. Upon this addition the viscosity of the sodium citrate solution increases significantly indicating a synergistic interaction between the sodium citrate and the foaming agent. The surfactant used was an alpha olefin sulfonate (AOS) soap brand name Witconate AOS from Akzo Nobel.

The mixing of the solution was performed at room temperature and then cube molds filled with the binder were placed in a conditioning room kept at 90% relative humidity and 90° F. temperature until the time of testing.

This example illustrates the effect of using solutions containing a sodium silicate to improve the compressive strength performance of foamed binders containing sodium citrate and class C fly ash blended with calcium sulfate dihydrate compared to blends with calcium sulfate hemihydrate on the aggregate particles obtained by the aforementioned mixing procedure. TABLE 1 shows the compositions and compressive strength values for fly ash slurries which were foamed in-situ by additing 2% sodium citrate and various dosages of sodium silicate and foaming agent (AOS). All admixtures and foaming agent were added to the water prior to mixing with the fly ash powder for 3 to 5 minutes to obtain a given density. FIG. 1 shows a graph of the data in Table 1, illustrating the relationship of compressive strength versus density for foamed fly ash binders containing sodium citrate and sodium silicate compared to binders containing sodium citrate without sodium silicate.

The admixtures used to activate the fly ash, such as potassium citrate, sodium citrate and optional additives such as citric acid, borax, boric acid were added to the mixing water prior to mixing with the fly ash, cement and any optional lightweight aggregate.

The compositions described herein were combined using a weight ratio of expanded clay aggregate to cement reactive powder of 0.56:1.0.

The cubes were kept inside a sealed plastic bag containing a moist towel at room temperature for 24 hours, demolded and then placed in a conditioning room at 90% relative humidity and 90° F. for the 14 day test. The maximum load required to crush the cubes was measured using a SATEC UTC 120HVL compression machine programmed to meet the rate of loading specified in the procedure in ASTM C109.

The compositions included in Example 1 were combined using a weight ratio of water to reactive powder of about 0.26/1 and a weight ratio of expanded clay aggregate to fly ash (reactive powder) of about 0.56/1.

The alkali citrate was dissolved in the water prior to mixing with cements at room temperature. Other experiments with the addition of solid alkali citrate to the mix with cement gave the same results. After mixing in a Hobart mixer the mix was placed in standard two inch cube molds.

The maximum load required to crush the cubes was measured at the time of testing using a SATEC UTC 120HVL compression machine programmed to meet the rate of loading specified by procedure ASTM C109.

The raw materials and ingredients used in these examples were as follows:
Sodium silicate
Alpha olefin sulfonate soap (Witconate)
Class C fly ash (Campbell)
Expanded clay aggregate
Sodium Citrate (Tri-sodium citrate monohydrate)

The weight ratio of water to fly ash reactive powder is typically in the range of 0.22 to 0.287:1.0, with weight ratios of 0.22 to 0.2:1 being preferred when the reactive powder is substantially 100 wt % class C fly ash and there is little or no gypsum. In the case in which part of the class C fly ash is replaced with class F fly ash, gypsum is used but the amount of gypsum is minimized in accordance with the preferred practice of the invention.

Example 1 (Mixes 1-17)—In Situ Mixing Procedure

Sodium silicate is first added to water and dissolved, then sodium citrate is added to the solution and dissolve. The soap foaming agent is then added to the solution of sodium silicate/ and sodium citrate. The resulting aqueous solution of sodium silicate, sodium citrate and soap is then added to Class C fly ash reactive powder and mixed in a Hobart mixer at medium speed. After about 40 seconds the mixer speed is increased (speed #3) and mixing is continued for a total of up to 4-6 minutes.

A solution containing 2.5 to 8.0% sodium silicate, 15 to 35% sodium citrate is made stirring until all the sodium silicate first and then the sodium citrate has been dissolved. To this solution 3-6% foaming agent is added. Upon this addition the viscosity of the sodium citrate solution increases significantly indicating a synergistic interaction between the sodium citrate and the foaming agent. The surfactant used was an alpha olefin sulfonate (AOS) soap brand name Witconate AOS from Akzo Nobel.

The liquids and the mixing was kept at room temperature and the cube molds with the binder was placed in a conditioning room kept at 90% relative humidity and 90 F temperature until the time of testing.

Table 1 shows the compositions of mixes containing class C fly ash in the weight ratios of 20/100 and 2.0 wt % sodium citrate with various dosages of sodium silicate and raw soap. In these compositions the weight % of sodium citrate to fly ash was kept constant at 2.0% by weight of fly ash. From Table 1, the data shows that increasing sodium silicate with sodium citrate increases the cube compressive strength at the same density for foamed fly ash binders compared to fly ash binders containing only sodium citrate.

The data in TABLE 1 also shows the effect of sodium citrate is diminished in the presence of borax compared to the effect of mixes containing boric acid. In comparing mixes 6 and 7 containing the same level (21.8 g) of sodium citrate but in the case of mix 6 using (7.2 g) citric acid and in the case of mix 7 using (7.2 g) of boric acid, the mix containing citric acid has a slightly better 3 hour compressive strength but similar 14 days compressive strength. In TABLE 1 CCS is an abbreviation for Cube compressive strength.

TABLE 1

| Class C Fly ash[1] g | Water g | Sodium Citrate g | Sodium Silicate g | Mix ID # | Raw Soap g | Sodium Citrate % wt FA | Sodium Silicate % wt FA | Mixing Time (min) | Density pcf | CCS psi |
|---|---|---|---|---|---|---|---|---|---|---|
| 1000 | 180.0 | 20 | 0 | 1 | 7.5 | 2.0% | 0.0% | 4 | 52.8 | 77 |
| 1000 | 180.0 | 20 | 0 | 2 | 7.5 | 2.0% | 0.0% | 3 | 59.7 | 336 |
| 1500 | 270.0 | 30 | 0 | 3 | 11.44 | 2.0% | 0.0% | 3 | 67.3 | 758 |
| 1500 | 270.0 | 30 | 0 | 4 | 15.08 | 2.0% | 0.0% | 3 | 64.9 | 563 |
| 1500 | 271.4 | 30 | 7.5 | 5 | 16.14 | 2.0% | 0.5% | 4 | 59.8 | 976 |
| 1500 | 271.4 | 30 | 7.5 | 6 | 11.44 | 2.0% | 0.5% | 4 | 63.6 | 1130 |
| 1500 | 271.4 | 30 | 7.5 | 7 | 11.44 | 2.0% | 0.5% | 3 | 70.6 | 1467 |
| 1500 | 271.4 | 30 | 7.5 | 8 | 16.15 | 2.0% | 0.5% | 5 | 53.6 | 596 |
| 1500 | 271.4 | 30 | 7.5 | 9 | 12.0 | 2.0% | 0.5% | 3 | 67.7 | 1313 |
| 1500 | 271.4 | 30 | 7.5 | 10 | 10.0 | 2.0% | 0.5% | 3 | 70.2 | 1543 |
| 1500 | 271.4 | 30 | 7.5 | 11 | 13.0 | 2.0% | 0.5% | 3 | 66.4 | 1202 |
| 1500 | 271.4 | 30 | 7.5 | 12 | 8.0 | 2.0% | 0.5% | 3 | 74.6 | 1708 |
| 1500 | 272.7 | 30 | 7.5 | 13 | 15.0 | 2.0% | 0.5% | 3 | 66.5 | 1115 |
| 1500 | 272.7 | 30 | 15.0 | 14 | 11.44 | 2.0% | 1.0% | 4 | 65.3 | 1408 |
| 1500 | 271.4 | 30 | 15.0 | 15 | 16.15 | 2.0% | 1.0% | 4 | 63.7 | 1132 |
| 1500 | 271.4 | 30 | 15.0 | 16 | 16.15 | 2.0% | 1.0% | 5 | 58 | 898 |
| 1500 | 271.4 | 30 | 15.0 | 17 | 16.15 | 2.0% | 1.0% | 6 | 51.9 | 546 |

[1]Campbell Class C fly ash, Witconate AOS soap

The effect of increasing sodium silicate content on the mix temperature rise for mixes with constant levels of sodium citrate is shown in the plotted graphs in FIG. 1. As can be seen in FIG. 1, mixes with higher dosages of sodium silicate have a sharper rise in compressive strength at the same density.

In the case of mixes #1 and #2 containing 2.0 wt % sodium citrate and no sodium silicate, the compressive strength rises to less than 800 psi at density of 67 pcf., compared to about 1200 to more than 1400 psi at the same density with addition of 0.5 to 1.0 wt. % sodium silicate to the same slurry of containing 2.0 wt % sodium citrate. This comparison indicates the presence of sodium silicate facilitates a reaction which correlates with the relatively higher early-age compressive strengths measured for mixes containing only sodium citrate.

Example 2

Mixing Procedure for Ex-Situ Foams

Mixing Procedure (Ex-Situ Foams)

A PVOH solution (concentration 2 to 5%) is first prepared using warm water (50 to 80 C) until PVOH is completely dissolved. The solution is allowed to reach to room temperature and then the surfactant soap (8% soap solution) is added and foamed prior to blending with fly ash/sodium citrate/water slurry using standard mixing procedures. For this example sodium silicate was not added and the main goal was to determine the influence of PVOH on foam fly ash binders using ex-situ foams. The surfactant used was an alpha olefin sulfonate (AOS) soap brand name Witconate AOS from Akzo Nobel. The PVOH used was CELVOL 205-S from Scksui Specialty Chemical America LLC, Scksui Chemical Company Ltd.

Formulations for Example #2 using a soap solution plus foaming agent with PVOH are included in Table 2-1 and formulations for Example #2 using 4% soap solution plus foaming agent without PVOH are included in Table 2-1. The total amount of liquids included the mixing water, the water used in the soap solution and the amount of foaming agent used to make the foam added to the fly ash and water mixtures. The data points included in Table 2-1 and Table 2-2 are plotted in FIG. 2. Cube specimens were cured similar to those in Example 1.

An improvement in the foam stability was noticed and the presence of relatively smaller foam bubbles using this foaming procedure. In the lab it was noticed that for mixtures with ex-situ foams prior to adding the PVOH, the foamed binders showed destabilizing effects such as collapse, and coalescence of the foam bubbles as soon as the binders were cast into the molds. These destabilizing effects were most noticeable near the top surface where the foamed binder was in contact with air. By contrast, mixtures with the PVOH added to the ex-situ foam did not collapse when blended into the fly ash/sodium citrate binders showing instead a network of fine cellular bubbles hard to see with the naked eye. The improved foam stability allowed for stable foamed fly ash binders with slurry densities in the range of 38 to 70 pcf. The addition of PVOH did not show significant effect on the compressive strength at the low end of the density range (38 to 40 pcf), but the improvement in compressive strength was noticeable for mixtures with densities above 40 pcf and particularly for mixtures in the range of 50 to 70 pcf. The results included in Tables 2-1 and 2-2, plotted in the graph in FIG. 2, indicates that adding PVOH can be used to improve brittle behavior of the fly ash binders by preventing the deformation of air bubbles added via (ex-situ) foams.

TABLE 2-1

Formulations for Example #2 using a soap solution plus foaming agent with PVOH

| Mix ID | Fly ash g | Total Liquids g | Sodium citrate g | Density pcf | Cube compressive strength (CCS) psi |
|---|---|---|---|---|---|
| 1 | 1000 | 245 | 20 | 53.1 | 408 |
| 2 | 1000 | 245 | 20 | 47.9 | 319 |
| 3 | 1000 | 245 | 20 | 46.8 | 320 |
| 4 | 1000 | 245 | 20 | 37.8 | 130 |
| 5 | 1000 | 245 | 20 | 39.3 | 113 |
| 6 | 1000 | 245 | 20 | 53.6 | 416 |
| 7 | 1000 | 245 | 20 | 62.5 | 807 |
| 8 | 1000 | 245 | 20 | 59.4 | 734 |
| 9 | 1000 | 245 | 20 | 53.6 | 430 |
| 10 | 1000 | 245 | 20 | 50.2 | 399 |
| 11 | 1000 | 245 | 20 | 50.7 | 348 |
| 12 | 1000 | 245 | 20 | 70.7 | 1262 |
| 13 | 1000 | 245 | 20 | 67.5 | 1284 |
| 14 | 1000 | 245 | 20 | 63.8 | 1039 |
| 15 | 1000 | 245 | 20 | 58.7 | 585 |

[1]Campbell Class C fly ash, Witconate AOS soap

TABLE 2-2

Formulations for Example #2 using a soap solution plus foaming

| Mix Id | Fly ash g | Total Liquids g | Sodium citrate g | Density pcf | Cube compressive strength (CCS) psi |
|---|---|---|---|---|---|
| 1 | 1000 | 245 | 20 | 73.6 | 487 |
| 2 | 1000 | 245 | 20 | 59.0 | 348 |
| 3 | 1000 | 245 | 20 | 55.5 | 310 |
| 4 | 1000 | 245 | 20 | 50.0 | 231 |
| 5 | 1000 | 245 | 20 | 39.7 | 132 |

[1]Campbell Class C fly ash, Witconate AOS soap

Figure 2:
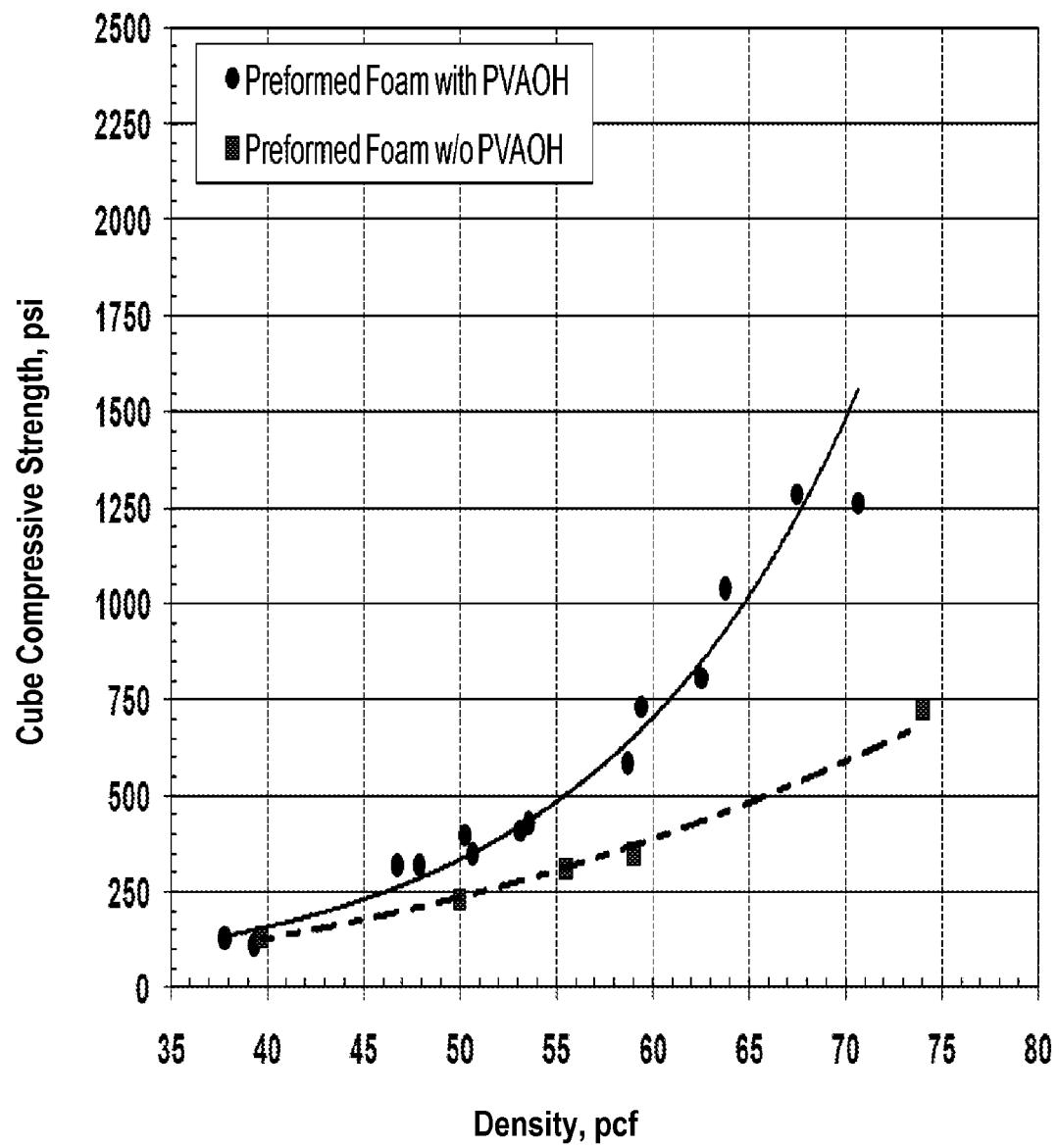
FIG. 2 is a graph of the results of Example 2 showing the compressive strength versus density for foamed fly ash binders with preformed foam with PVOH for data points included in Table 2-1 and mixtures with preformed foam without PVOH for data points in Table 2-2.

In the graph in FIG. 2, compressive strength versus density for foamed fly ash binders with preformed foam with PVOH for data points included in TABLE 2-1 and mixtures with preformed foam without PVOH for data points in TABLE 2-2. This method is advantageous because the relatively smaller bubble size would allow a relatively higher percentage of air to be mixed in the fly ash binders.

Example 3

Mixtures Made Using Class F Fly Ash

The previous experiments concentrated on the use of class C fly ash as the main cementitious binder in combination with sodium or potassium citrate, since preliminary results with class F fly ash indicated relatively lower compressive strength of class F fly ash binders compared to similar formulations with class C fly ash. Since it is commercially desirable to be able to use either type of fly ash depending on the local sources of coal being used. It is well known and chemical analysis showed that the main difference in the chemical composition between the class C and class F fly ash is the higher lime content for the class C relative to the class F fly ash (20% versus 10%).

For this example the mixtures included the following components:

Component A=Class F Fly Ash
Component B=Type III PC
Component C=Water
Process Variable X=Sodium citrate The lower and upper bounds for the amounts of each of the mixture components as well as the normalized proportions used in Example 3 are included in TABLE 3-1. Notice the lower and upper bounds for each component, combined with the total mix imposes the study constraints. For example, there is minimum water content as dictated by practical conditions of the experiment. In addition, we notice that the major component for the mixtures is the class F fly ash and this was chosen based on previous experience with these mixtures. Similarly, the low level of sodium citrate was chosen based on previous work, where the high level was chosen to gather information at a relatively higher level as previously studied.

TABLE 3-1

Components of Mixtures Used in Example 3

| Component | Description | Mixture Components Amount (g) | | Mixture Components Proportions (normalized to the total mix) | |
|---|---|---|---|---|---|
| | | Lower | Upper | Lower | Upper |
| A | Class F Fly ash | 840 | 1350 | 0.47 | 0.75 |
| B | Type III | 0 | 510 | 0.0 | 0.28 |
| C | Mix water | 400 | 620 | 0.22 | 0.34 |
| X1 | Sodium citrate | 55 | 160 | | |

TABLE 3-2 shows the experimental mixture design. Thirty-eight mixtures were prepared using standard mixing techniques described elsewhere. The mixture components were combined with expanded clay aggregate and perlite holding at a constant level. The sodium citrate was added to the mixing water prior to mixing with the fly ash, cement and lightweight aggregate.

In addition, TABLE 3-2 includes the mix components expressed as (water to fly ash plus cement) W/C ratio. The fly ash content is expressed as FA/(FA+PC) percentage. Please note W=mix water, C=FA+PC=total cements (or reactive powder), FA=Class F fly ash content and PC=Portland cement type III content. In TABLE 3-2, the amounts are in grams unless indicated as a percentage. In TABLE 3-2 and 3-3, PC means Portland cement and FA means fly ash.

TABLE 3-2

(Amounts in grams unless indicated as a percentage)

| Run Order | Class F Fly Ash | Type III PC | Mix Water | Na Citrate | ECLA | Perlite | Na Citrate | W/C | FA/ (PC + FA) |
|---|---|---|---|---|---|---|---|---|---|
| 1 | 865 | 510 | 425 | 55 | 481 | 83 | 4.0% | 0.309 | 62.9% |
| 2 | 1213 | 143 | 445 | 55 | 474 | 81 | 4.1% | 0.328 | 89.5% |
| 3 | 1213 | 118 | 470 | 55 | 466 | 80 | 4.1% | 0.353 | 91.2% |
| 4 | 890 | 510 | 400 | 160 | 490 | 84 | 11.4% | 0.286 | 63.6% |
| 5 | 1265 | 0 | 535 | 160 | 443 | 76 | 12.6% | 0.423 | 100.0% |
| 6 | 1010 | 170 | 620 | 55 | 413 | 71 | 4.7% | 0.525 | 85.6% |
| 7 | 958 | 288 | 555 | 55 | 436 | 75 | 4.4% | 0.446 | 76.9% |
| 8 | 840 | 510 | 450 | 160 | 473 | 81 | 11.9% | 0.333 | 62.2% |
| 9 | 1075 | 235 | 490 | 55 | 459 | 79 | 4.2% | 0.374 | 82.1% |
| 10 | 1120 | 280 | 400 | 160 | 490 | 84 | 11.4% | 0.286 | 80.0% |
| 11 | 1213 | 143 | 445 | 160 | 474 | 81 | 11.8% | 0.328 | 89.5% |
| 12 | 840 | 340 | 620 | 55 | 413 | 71 | 4.7% | 0.525 | 71.2% |
| 13 | 1350 | 50 | 400 | 55 | 490 | 84 | 3.9% | 0.286 | 96.4% |
| 14 | 840 | 510 | 450 | 55 | 473 | 81 | 4.1% | 0.333 | 62.2% |
| 15 | 1120 | 280 | 400 | 55 | 490 | 84 | 3.9% | 0.286 | 80.0% |
| 16 | 1128 | 118 | 555 | 160 | 436 | 75 | 12.9% | 0.446 | 90.6% |
| 17 | 840 | 425 | 535 | 160 | 443 | 76 | 12.6% | 0.423 | 66.4% |
| 18 | 1180 | 0 | 620 | 55 | 413 | 71 | 4.7% | 0.525 | 100.0% |
| 19 | 1265 | 0 | 535 | 55 | 443 | 76 | 4.3% | 0.423 | 100.0% |
| 20 | 1350 | 25 | 425 | 55 | 481 | 83 | 4.0% | 0.309 | 98.2% |
| 21 | 1350 | 50 | 400 | 160 | 490 | 84 | 11.4% | 0.286 | 96.4% |
| 22 | 983 | 373 | 445 | 55 | 474 | 81 | 4.1% | 0.328 | 72.5% |
| 23 | 1350 | 0 | 450 | 160 | 473 | 81 | 11.9% | 0.333 | 100.0% |
| 24 | 958 | 373 | 470 | 160 | 466 | 80 | 12.0% | 0.353 | 72.0% |
| 25 | 1128 | 118 | 555 | 55 | 436 | 75 | 4.4% | 0.446 | 90.6% |
| 26 | 958 | 288 | 555 | 160 | 436 | 75 | 12.9% | 0.446 | 76.9% |
| 27 | 890 | 510 | 400 | 55 | 490 | 84 | 3.9% | 0.286 | 63.6% |
| 28 | 983 | 373 | 445 | 160 | 474 | 81 | 11.8% | 0.328 | 72.5% |
| 29 | 1213 | 118 | 470 | 160 | 466 | 80 | 12.0% | 0.353 | 91.2% |
| 30 | 1075 | 235 | 490 | 160 | 459 | 79 | 12.2% | 0.374 | 82.1% |
| 31 | 1350 | 0 | 450 | 55 | 473 | 81 | 4.1% | 0.333 | 100.0% |
| 32 | 865 | 510 | 425 | 160 | 481 | 83 | 11.6% | 0.309 | 62.9% |
| 33 | 958 | 373 | 470 | 55 | 466 | 80 | 4.1% | 0.353 | 72.0% |
| 34 | 1180 | 0 | 620 | 160 | 413 | 71 | 13.6% | 0.525 | 100.0% |
| 35 | 840 | 340 | 620 | 160 | 413 | 71 | 13.6% | 0.525 | 71.2% |
| 36 | 1350 | 25 | 425 | 160 | 481 | 83 | 11.6% | 0.309 | 98.2% |
| 37 | 840 | 425 | 535 | 55 | 443 | 76 | 4.3% | 0.423 | 66.4% |
| 38 | 1010 | 170 | 620 | 160 | 413 | 71 | 13.6% | 0.525 | 85.6% |

TABLE 3-3

Cube compressive strength data for mixtures used for Example 3

| Run Order | Class F Fly Ash | Type III PC | Mix Water | Sodium Citrate | W/C | FA/ (PC + FA) | Density (pcf) | 24 hr- CCS (psi) | 14 Days CCS (psi) |
|---|---|---|---|---|---|---|---|---|---|
| | | Amount (g) | | | | | | | |
| 1  | 865  | 510 | 425 | 55  | 0.309 | 62.9%  | 92.2 | 1185 | 4897 |
| 2  | 1213 | 143 | 445 | 55  | 0.328 | 89.5%  | 89.9 | 529  | 1279 |
| 3  | 1213 | 118 | 470 | 55  | 0.353 | 91.2%  | 85.4 | 301  | 1199 |
| 4  | 890  | 510 | 400 | 160 | 0.286 | 63.6%  | 92.2 | 805  | 2710 |
| 5  | 1265 | 0   | 535 | 160 | 0.423 | 100.0% | 80.8 | 125  | 184  |
| 6  | 1010 | 170 | 620 | 55  | 0.525 | 85.6%  | 80.0 | 90   | 358  |
| 7  | 958  | 288 | 555 | 55  | 0.446 | 76.9%  | 82.6 | 157  | 1446 |
| 8  | 840  | 510 | 450 | 160 | 0.333 | 62.2%  | 89.9 | 595  | 1886 |
| 9  | 1075 | 235 | 490 | 55  | 0.374 | 82.1%  | 87.8 | 330  | 1982 |
| 10 | 1120 | 280 | 400 | 160 | 0.286 | 80.0%  | 89.5 | 843  | 1677 |
| 11 | 1213 | 143 | 445 | 160 | 0.328 | 89.5%  | 85.6 | 569  | 1151 |
| 12 | 840  | 340 | 620 | 55  | 0.525 | 71.2%  | 79.9 | 115  | 1779 |
| 13 | 1350 | 50  | 400 | 55  | 0.286 | 96.4%  | 89.8 | 788  | 778  |
| 14 | 840  | 510 | 450 | 55  | 0.333 | 62.2%  | 90.8 | 822  | 4218 |
| 15 | 1120 | 280 | 400 | 55  | 0.286 | 80.0%  | 84.1 | 549  | 1442 |
| 16 | 1128 | 118 | 555 | 160 | 0.446 | 90.6%  | 84.3 | 374  | 571  |
| 17 | 840  | 425 | 535 | 160 | 0.423 | 66.4%  | 85.2 | 232  | 901  |
| 18 | 1180 | 0   | 620 | 55  | 0.525 | 100.0% | 74.1 | 0    | 0    |
| 19 | 1265 | 0   | 535 | 55  | 0.423 | 100.0% | 72.5 | 0    | 0    |
| 20 | 1350 | 25  | 425 | 55  | 0.309 | 98.2%  | 88.3 | 657  | 948  |
| 21 | 1350 | 50  | 400 | 160 | 0.286 | 96.4%  | 88.3 | 395  | 599  |
| 22 | 983  | 373 | 445 | 55  | 0.328 | 72.5%  | 91.0 | 838  | 3391 |
| 23 | 1350 | 0   | 450 | 160 | 0.333 | 100.0% | 85.4 | 49   | 87   |
| 24 | 958  | 373 | 470 | 160 | 0.353 | 72.0%  | 88.8 | 367  | 1110 |
| 25 | 1128 | 118 | 555 | 55  | 0.446 | 90.6%  | 81.0 | 137  | 679  |
| 26 | 958  | 288 | 555 | 160 | 0.446 | 76.9%  | 83.6 | 90   | 631  |
| 27 | 890  | 510 | 400 | 55  | 0.286 | 63.6%  | 93.2 | 1293 | 4108 |
| 28 | 983  | 373 | 445 | 160 | 0.328 | 72.5%  | 88.3 | 472  | 1331 |
| 29 | 1213 | 118 | 470 | 160 | 0.353 | 91.2%  | 85.9 | 405  | 701  |
| 30 | 1075 | 235 | 490 | 160 | 0.374 | 82.1%  | 84.2 | 297  | 1022 |
| 31 | 1350 | 0   | 450 | 55  | 0.333 | 100.0% | 84.2 | 239  | 622  |
| 32 | 865  | 510 | 425 | 160 | 0.309 | 62.9%  | 89.7 | 688  | 2021 |
| 33 | 958  | 373 | 470 | 55  | 0.353 | 72.0%  | 87.3 | 414  | 3933 |
| 34 | 1180 | 0   | 620 | 160 | 0.525 | 100.0% | 76.1 | 0    | 0    |
| 35 | 840  | 340 | 620 | 160 | 0.525 | 71.2%  | 82.1 | 109  | 441  |
| 36 | 1350 | 25  | 425 | 160 | 0.309 | 98.2%  | 85.2 | 209  | 421  |
| 37 | 840  | 425 | 535 | 55  | 0.423 | 66.4%  | 84.5 | 318  | 3474 |
| 38 | 1010 | 170 | 620 | 160 | 0.525 | 85.6%  | 79.1 | 53   | 345  |

TABLE 3-3 includes the cube compressive strength data for mixtures used in example 2 measured after 24 hrs and after 14 days of curing.

The observations from the 24-hr CCS data are as follows:
The 24 hr-strength is significantly reduced by increasing water content especially for those mixtures with relatively lower level of sodium citrate
The reduction in strength can be compensated by increasing sodium citrate
Increasing the amount of Portland cement (by reducing the amount of class F fly ash), significantly increases the 24-hr compressive strength. This is the contrary to the results observed with the use of class C fly ash.

The observations from the 24-hr CCS data are as follows:
The 24 hr-strength is significantly reduced by increasing water content especially for those mixtures with relatively lower level of sodium citrate
The reduction in strength can be compensated for by increasing sodium citrate. Increasing portland cement (by reducing the amount of class F fly ash), significantly increases the 24-hr compressive strength. This is the opposite behavior observed for results with class C fly ash reported in previous testing we performed.

The following observations have been made from the analysis of the compressive strength for mixtures used in Example 3:

Overall, strength decreases as the water to solids ratio is increased.
The 24-hr CCS and 14 days CCS are directly correlated.
The 14-days CCS and class F fly ash content are inversely correlated but directly correlated to the Portland cement content.

The results of Example 3 indicate blends of Class F fly ash with Type III PC with sodium citrate can be used to achieve desired strengths.

These results further indicate when lime deficient class F fly ash is used, addition of small amounts of the Portland cement are needed to supplement the lime and alumina content to achieve the required strength.

A preferred formulation parameters for the mixtures of class F fly ash and Type III Portland cement formulation based upon the results of Example 3 are as follows:
70 to 90% Class F fly ash
10 to 30% Portland cement type III
Sodium citrate 2 to 4%
Water/(fly ash+portland cement)<0.37 and preferred <0.33

Example 4.

This example further illustrates the effect of using solutions containing a sodium silicate to improve the compressive strength performance of foamed binders containing sodium citrate and class C fly ash.

TABLE 4-1 and 4-2 show the composition and compressive strength values for foamed fly ash mixtures using sodium citrate and foam/soap added to the water and Tables 3-3 and 3-4 show compositions and compressive strength of foamed fly ash mixes in which sodium silicate and sodium citrate and foaming agent are added to water before being mixed with the fly ash reactive powder.

Mixes #2 and #4 in TABLE 4-1, with a density of 65.4 and 59.8 pcf, respectively, had a 14 day compressive strength of 661 and 479, respectively. In TABLE 3-2, we noted similar detrimental effect of reducing the density of mixtures where the compressive strength of mix #2, with a density of 62.9 pcf, had a compressive strength of 514 psi.

All of the test mixtures below have a class C fly ash content of 1000 g. and a sodium citrate content of 40 g., giving a sodium citrate wt % of 4.0% based upon the weight of Class C fly ash.

As shown in TABLES 4-3 and 4-4, mixtures containing both sodium silicate and sodium citrate had compressive strengths which were more than double the compressive strengths of mixtures without sodium silicate in TABLES 3-1 and 3-2. For example, mix #1 in TABLE 4-3 with a density of 51.4 pcf had a compressive strength of 471 psi which was comparable to the compressive strength of 479 psi for mix #4 in TABLE 4-1 with a density of 59.8 when no sodium silicate is added. Moreover, mixes made with densities in the range of

TABLE 4-1

| MIx # | Fly Ash g | $H_2O$ g | Na Citrate g | Raw Soap g | Na Citrate % wt FA % | Na Citrate % Soln. % | Soap Conc % | W/FA | Density pcf | CCS psi |
|---|---|---|---|---|---|---|---|---|---|---|
| 1 | 1600 | 368 | 192 | 0  | 12.0 | 34.3 | 0.0 | 0.23 | 128  | 6798 |
| 2 | 1600 | 368 | 192 | 16 | 12.0 | 33.3 | 4.2 | 0.23 | 65.4 | 661  |
| 3 | 1600 | 368 | 192 | 8  | 12.0 | 33.8 | 2.1 | 0.23 | 80.0 | 1298 |
| 4 | 1600 | 368 | 192 | 18 | 12.0 | 33.2 | 4.7 | 0.23 | 59.8 | 479  |
| 5 | 1600 | 368 | 192 | 16 | 12.0 | 33.3 | 4.2 | 0.23 | 86.1 | 1565 |

TABLE 4-2

| MIx # | Fly Ash g | $H_2O$ g | Na Citrate g | Raw Soap g | Na Citrate % wt FA % | Na Citrate % Soln. % | Soap Conc % | W/FA | Density pcf | CCS psi |
|---|---|---|---|---|---|---|---|---|---|---|
| 1 | 1000 | 280 | 90 | 7.5 | 9.0 | 32.4 | 4.0 | 0.28 | 45.3 | 169   |
| 2 | 1000 | 280 | 90 | 7.5 | 9.0 | 29.9 | 4.0 | 0.28 | 62.9 | 514   |
| 3 | 1000 | 280 | 90 | 7.5 | 9.0 | 27.2 | 4.0 | 0.28 | 42.9 | 161   |
| 4 | 1000 | 280 | 65 | 7.5 | 6.5 | 24.2 | 4.0 | 0.28 | 32.6 | 84    |
| 5 | 1000 | 280 | 90 | 7.5 | 9.0 | 29.9 | 4.0 | 0.28 | 44.2 | 162.3 |

TABLE 4-3

| MIx # | Na Silicate g | $H_2O$ g | Raw Soap g | Na Silicate % wt FA % | Na Citrate % Soln. % | Soap Conc % | W/FA | Density pcf | CCS psi |
|---|---|---|---|---|---|---|---|---|---|
| 1 | 15 | 182.7 | 5.0 | 1.5 | 17.6 | 2.7 | 0.180 | 51.4 | 471 |
| 2 | 25 | 184.0 | 7.5 | 2.5 | 17.2 | 3.9 | 0.182 | 54.6 | 503 |

All of the test mixtures have a class C fly ash content of 1000 g. and a sodium citrate content of 40 grams, giving a sodium citrate wt % of 4.0% based upon the weight of Class C fly ash.

59.5 to 65.5 pcf in TABLE 4-4, which have compressive strengths of 891 to 1327 psi compared favorably to mixes without sodium silicate in TABLE 4-1 which had a compressive strength of 660 psi with a density of 65.4 pcf.

TABLE 4-4

| MIx # | Na Silicate g | $H_2O$ g | Raw Soap g | Na Silicate % wt FA % | Na Citrate % Soln. % | Soap Conc % | W/FA | Density pcf | CCS psi |
|---|---|---|---|---|---|---|---|---|---|
| 1 | 5  | 180.9 | 6   | 0.5 | 17.6 | 3.2 | 0.180 | 44.4 | 334  |
| 2 | 10 | 181.8 | 6   | 1.0 | 17.6 | 3.2 | 0.180 | 61.4 | 1010 |
| 3 | 15 | 182.7 | 6   | 1.5 | 17.5 | 3.2 | 0.180 | 62.4 | 1159 |
| 4 | 5  | 180.9 | 5.5 | 0.5 | 17.7 | 3.0 | 0.180 | 59.5 | 891  |
| 5 | 20 | 180.0 | 5   | 2.0 | 17.8 | 2.7 | 0.176 | 65.5 | 1327 |
| 6 | 20 | 183.6 | 6   | 2.0 | 17.4 | 3.2 | 0.180 | 63.3 | 1182 |

In reviewing the results in TABLES 4-3 and 4-4, increasing the weight % of sodium silicate beyond 1.5 wt % of the fly ash did not significantly improve compressive strength and is therefore not preferred. Dosages of over 1.5 wt % sodium silicate have also shown a tendency to reduce the efficiency of the foaming agent. The recommended dosage of sodium silicate is between about 0.25 to 1.5 wt. %, with a preferred range of about 0.5 to 1.0 wt. %. A dosage of less than 0.25 wt % sodium silicate does not provide significant improvement in compressive strength.

It has also been found that the sodium silicate appears to help control the initial exothermic reaction and the blowing of the viscous fly ash and sodium citrate binder that forms during the initial 3-6 minutes of mixing which is required to foam the fly ash and sodium citrate.

In a preferred embodiment the mixture has a density between about 30 and 65 pcf and a compressive strength measured after 14 days of between about 1000 to 1400 psi.

Although we have described the preferred embodiments for implementing our invention, it will be understood by those skilled in the art to which this disclosure is directed that modifications and additions may be made to our invention without departing from its spirit and scope.

I claim:

1. A method of providing a lightweight cementitious mixture having improved compressive strength and water durability comprising:
   mixing
   water,
   reactive powder,
   an aggregate,
   an alkali metal salt of citric acid,
   an alkali metal silicate,
   a foaming agent, and
   an optional foam stabilizer,
   wherein the weight ratio of water to reactive powder is about 0.22 to 0.287:1.0, the reactive powder comprising 75 to 100 wt. % fly ash, and no hydraulic cement in the reactive powder, wherein the mixture has a density between about 30 and 65 pcf, and wherein the mixture has a compressive strength, measured after 14 days, of 334 psi to about 1400 psi.

2. The method of claim 1, wherein polyvinyl alcohol foam stabilizer solution is added to the foaming agent and water to make the foam ex-situ before addition of the reactive powder, aggregate, alkali metal salt of citric acid and alkali metal silicate.

3. The method of claim 1, wherein the reactive powder comprises 88.5 to 100% fly ash, based upon weight of the reactive powder.

4. The method of claim 1, wherein the reactive powder comprises 88.5 to 100 wt % class C fly ash.

5. The method of claim 1, wherein the reactive powder contains 10 to 40 wt. % lime.

6. The method of claim 1, wherein the alkali metal salt of citric acid is at least one member of the group consisting of sodium citrate, potassium citrates, and mixture thereof.

7. The method of claim 1, wherein the alkali metal salt of citric acid is in an amount of about 1.5 to 6 wt. % based on the weight of the fly ash reactive powder.

8. The method of claim 1, wherein the alkali metal salt of citric acid is in an amount of about 1.5 to 4 wt. % based on the weight of the cementitious reactive powder.

9. The method of claim 1, wherein the alkali metal salt of citric acid is in an amount of about 2 to 3.5 wt. % based on the weight of the cementitious reactive powder.

10. The method of claim 1, wherein the cementitious reactive powder further comprises silica fume.

11. The method of claim 1, further comprising admixing at least one member of the group consisting of air-entraining agent, a secondary inorganic set accelerator, and mixtures thereof, to the mixture.

12. The method of claim 1, wherein the fly ash is class C fly ash, and no citric acid, tartaric acid, malic acid, acetic acid, or boric acid are added to the mixture and the setting of the mixture is achieved in about 4 to 6 minutes after forming the mixture.

13. A composition for preparing a lightweight cementitious binder for cement board comprising a mixture of:
   cementitious reactive powder comprising 75 to 100 wt % fly ash;
   an aggregate;
   an alkali metal salt of citric acid;
   an alkali metal silicate;
   a foaming agent;
   an optional polyvinyl alcohol foam stabilizing agent, and water,
     wherein the ratio of water to cementitious reactive powder solids in the mixture is about 0.22 to 0.287:1,
     wherein the concentration of polyvinyl alcohol to water in the foam is about 2 to 5%,
     wherein the fly ash comprises class C fly ash, class F fly ash with type III Portland cement; and mixtures of class C and class F fly ash with optional type III Portland cement;
     wherein the density of the binder is about 30 to about 65 pcf, and the binder has a compressive strength measured after 14 days of 334 psi to about 1400 psi.

14. The composition of claim 13, wherein the reactive powder comprises 88.5 to 100 wt. % Class C fly ash, the reactive powder further comprising optional silica fume, but no hydraulic cement or gypsum.

15. The composition of claim 13, wherein the mixture comprises about 1.5 to 6.0 wt. %, based upon the weight of cementitious powder, of at least one alkali metal salt of citric acid selected from the group consisting of sodium citrates, potassium citrates and mixtures thereof and at least one alkali metal silicate selected from the group consisting of sodium silicate, potassium silicate and mixtures thereof.

16. The composition of claim 15, wherein the mixture comprises about 1.5 to 3.5 wt. %, sodium citrate and 0.25 to 1.0 wt. % powdered sodium silicate, based upon the weight of the cementitious powder.

17. The composition of claim 15, wherein the mixture comprises about 2.0 to 3.5 wt. % sodium citrate and 0.5 to 1.0 wt. % sodium silicate, based on the weight of the cementitious reactive powder.

18. The method of claim 1, wherein the mixture has a compressive strength measured after 14 days of between about 1000 psi to 1400 psi.

* * * * *